United States Patent [19]

Bonanos

[11] 4,378,545

[45] Mar. 29, 1983

[54] MOMENT FREE TOROIDAL MAGNET

[75] Inventor: Peter Bonanos, East Brunswick, N.J.

[73] Assignee: The United States of America as represented by the United States Department of Energy, Washington, D.C.

[21] Appl. No.: 239,866

[22] Filed: Mar. 2, 1981

[51] Int. Cl.³ .............................................. H01F 7/22
[52] U.S. Cl. .................................................... 335/216
[58] Field of Search ......................................... 335/216

[56] References Cited

U.S. PATENT DOCUMENTS 3,736,539 5/1973 File et al. ............................. 335/216
4,263,096 4/1981 Ohkawa et al. ..................... 335/216

Primary Examiner—William M. Shoop
Attorney, Agent, or Firm—Steven M. Rabin; Judy Winegar Goans; Richard C. Besha

[57] ABSTRACT

A toroidal magnet for confining a high magnetic field for use in fusion reactor research and nuclear particle detection. The magnet includes a series of conductor elements arranged about and fixed at its small major radius portion to the outer surface of a central cylindrical support each conductor element having a geometry such as to maintain the conductor elements in pure tension when a high current flows therein, and a support assembly which redistributes all or part of the tension which would otherwise arise in the small major radius portion of each coil element to the large major radius portion thereof.

18 Claims, 7 Drawing Figures

MOMENT FREE TOROIDAL MAGNET

BACKGROUND OF THE INVENTION

This invention was made in the course of or under a contract with the U.S. Department of Energy.

High strength toroidal magnetic fields are required for a specific class of thermonuclear fusion research devices usually referred to as "closed magnetic confinement machines" such as tokamaks. Machines of this type which have already been built or are now under construction are described in Princeton University Plasma Physics Laboratory report PPPL-1698 (Princeton, N.J., October 1980) authored by J. File et al. Other uses of toroidal magnetic fields producing devices are: (1) in particle detectors used in high energy physics research and (2) as energy storage devices for the electric power industry.

The present practice uses circular or "D-shaped" toroidal field (TF) coils to produce the toroidal field. These fields exert very large forces on the coils involved. For example, the vertical force on each coil in the Princeton Plasma Physics Laboratory's "Princeton Large Torus" (PLT) is approximately 2 million pounds when operating with a central field of 47 kilogauss. In order to withstand such forces in a stable manner, it has been advantageous that the coils of the magnet have a moment-free design.

Designs for moment-free toroidal conducting and superconducting magnetics for producing high fields at a distance from a high temperature toroidal plasma column in fusion research applications are known. Such a design of which the applicant is a coinventor is disclosed in U.S. Pat. No. 3,736,539. The apparatus of that design is a large superconducting moment-free toroidal magnet having a series of substantially "D"-shaped coil elements in pure tension that are supported on an inner cylindrical member.

The individual "D"-shaped coil elements disclosed in U.S. Pat. No. 3,736,539, which have a weight on the order of 100,000 pounds, are in uniform tension during operation. For a number of reasons such uniform tension is not completely desirable. As is illustrated in Prior Art FIGS. 1 and 2, uniform tension in the coil element 102 means that the vertical force exerted on the small (inner) major radius portion 104 at $R_1$ and the larger (outer) major radius portion 106 at $R_2$ are equal. Thus, the structural strength requirements for withstanding tension forces in portions 104 and 106 are the same. However, as is illustrated in FIG. 1, the cross sectional area available for the coil is less for the inner portion 104 than for the outer portion 106. For example, the PLT toroidal field coil has a copper cross section of 72 square inches at $R_1$ and 166 square inches at $R_2$. The smaller area at $R_1$ clearly limits the possible tensile strength of the coil and thus the maximum toroidal field which may safely be generated within the coil.

Another disadvantage of such coils is that they must be constructed so that they may be disassembled from the central support members and also be capable of withstanding very high uniform stresses. Such disassembly is important for maintenance of the magnetic or fusion device. A difficulty in disassembling prior TF coil elements is that a poloidal field (PF) coil or vacuum chamber is located within and extends perpendicularly through the toroidal coils. In order that individual TF coil elements have the strength to withstand high tensile forces and yet be removable without segmenting the PF coil or vacuum chamber, it has been necessary to construct each TF coil element with very strong joints using pins and hydraulic clamps to connect the inner and outer portions of each TF coil element together, as is disclosed in J. File et al, Princeton University Plasma Physics Laboratory Report No. PPPL-1698 (Princeton, N.J. Oct. 1980). Such coil joints are very difficult and expensive to manufacture.

Previously proposed TF coils in nuclear particle detectors for use in high energy physics research have still further limitations. In such detectors, charged particles originate at the center of the torus ($R=0$, $Z=0$, in FIG. 2). The particle properties are determined by the curvature of their trajectories when moving within a magnetic field inside the torus. (Such devices with conventional coils are disclosed in a paper entitled "A Multi-Purpose Central Detector Using A Toroidal Magnetic" by P. Spillantini and T. M. Taylor, presented at the Instituto Nazionale di Fisica Nucleare, Frascati, Italy, ECFA/LEP Working Group SSG/13/7, Aug. 10, 1979, and a publication entitled "Toroidal Magnets" by B. Pope, L. Rosenson and R. M. Taylor, BNL 50885 Brookhaven National Laboratories, July 1978.) Prior to their detection within the toroidal field, the particles must pass through the small (inner) major radius portion of the coil elements. However, the structural requirements needed to withstand the tensile stresses in the coil provide minimum requirements on the cross section area of the inner portion of the TF coil and thus limits the transparency of the TF coil to the particles, and therefore the efficiency of the detection apparatus.

It is an object of this invention, therefore, to provide a moment-free toroidal magnet design providing current carrying elements having a reduced tension at its small (inner) major radius portion.

It is also an object of this invention to provide an assembly of conducting or superconducting coils and a supporting assembly, which affords a strong magnetic field for confining a large cross section plasma column, wherein the individual coils are jointed at their respective small major radius portions without affecting the ability of the structure to withstand the large tensile stresses generated by said strong magnetic field.

It is still another object of this invention to provide conducting or superconducting coils and a supporting assembly for providing a strong magnetic field, wherein the cross sectional area of their respective small major radius portions are substantially reduced without affecting the ability of the structure to withstand the large tensile stresses generated by said strong magnetic field.

SUMMARY OF THE INVENTION

This invention provides a moment-free toroidal magnet for creating strong toroidal magnetic fields, including high current carrying coil elements having reduced tensile stress in their respective small (inner) major radius portions. In fact, in accordance with the design of the present invention, the tensile force in the inner portions may be reduced to zero, or the inner portions may even be put into compression, when the coil elements are energized with a large current flowing therein.

More particularly, the invention provides upper and lower structural support elements respectively symmetrically located above and below the central support cylinder of the magnet and respectively fixed to the inner and outer portions of the coil elements, which reduce the tensile stress in the inner portion when the coil elements are energized by a high current flow therein. In one embodiment of the invention the support elements comprise disks located above and below the central support cylinder, rigid, vertically extending compression cylinders which respectively connect the disks to the respective inner portions of the coil elements, and tension links which tangentially connect the outer portion of the respective coil elements to the disks. The cylinders transmit compression, which would otherwise be transmitted as tension through the coil element inner portions, to the coil element outer portions through tension in the disks and tension links.

This design allows relatively simple bolted coil joints to be used at the intersections of the inner and outer portions of the coil elements, which permits the outer portions to be removed for maintenance. When used in a high energy nuclear particle detection device, the cross sectional area of the inner portion of the coil elements may be reduced to improve the particle transparency of the coil elements.

Because the tensile force is reduced in the restrictive inner region ($r = r_1$) of a TF coil (see FIG. 3), this design also means that higher magnetic field strengths can be produced. This is advantageous in a thermonuclear fusion reactor and an electrical energy storage device. In a reactor, more intense magnetic fields reduce power losses from thermonuclear plasmas. In an electrical energy storage device, more energy can be stored since the energy stored is proportional to the square of the magnetic field strength.

BRIEF DESCRIPTION OF THE DRAWINGS

The above and further features and objects of the invention will be better understood from the following detailed description of the preferred embodiment when taken with the appended drawings in which.

DETAILED DESCRIPTION OF THE PREFERRED EMBODIMENT

Figure 1:
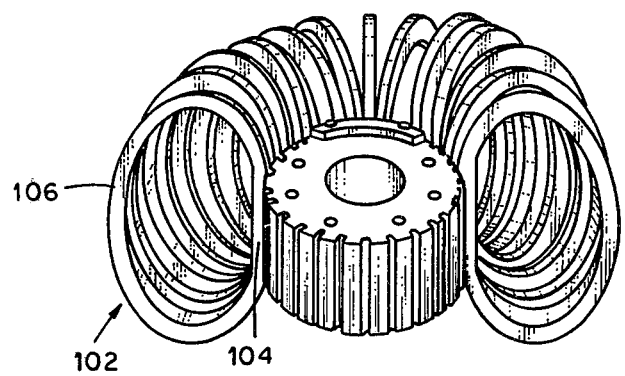
FIG. 1 is a partial perspective drawing of a toroidal magnet of the prior art.
Figure 2:
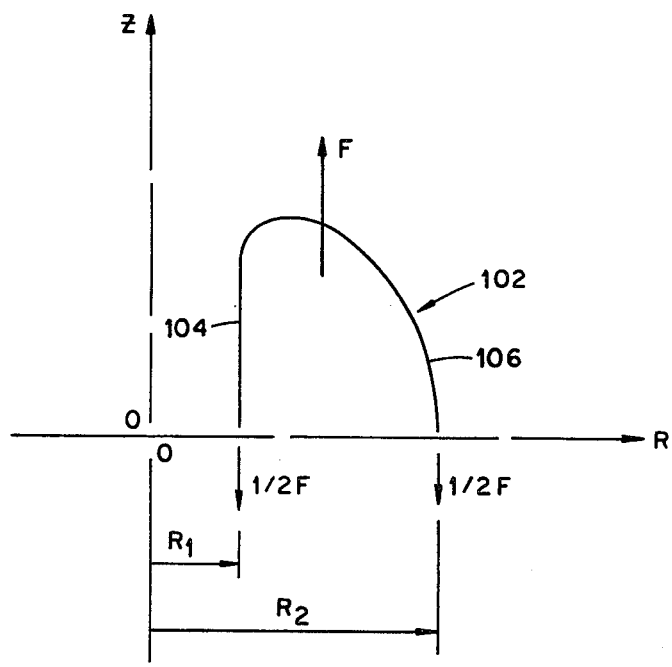
FIG. 2 is a schematic drawing of a coil element of the prior art illustrating the tensile forces thereon.
Figure 3:
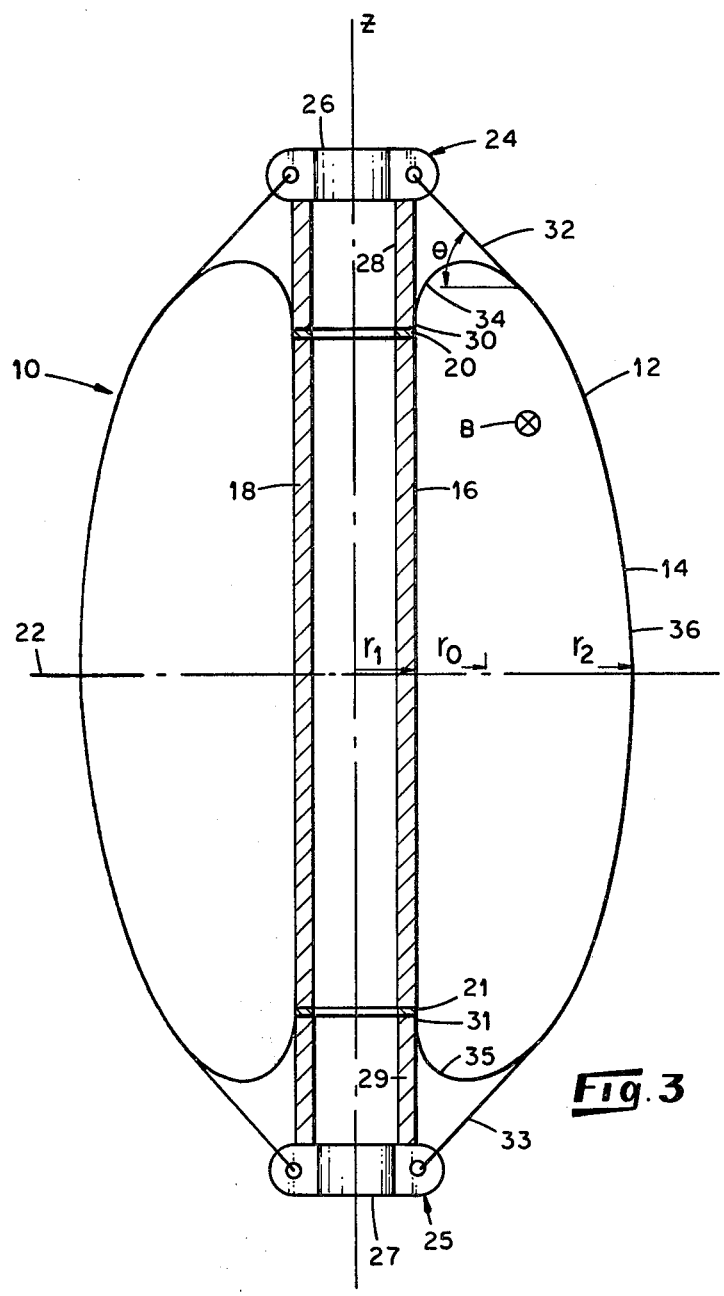
FIG. 3 is a cross sectional drawing of a first embodiment of the present invention.

Referring first to FIG. 3, the first embodiment of the magnet of the present invention includes a torus 10 comprising a plurality of bow-shaped ribbon-like superconducting coils 12. Each coil 12 and its support structure is symmetrical with respect to a horizontal midplane 22. The composition and cross sectional shape of these coils are well known and illustrated, for example, in U.S. Pat. No. 3,736,539. The cross section may also be "pie section"-shaped as in the Princeton University large torus, illustrated in FIG. 11 of Princeton University Plasma Physics Laboratory Report PPPL-1698 (October 1980). The coils may be composed of highly conducting materials such as copper or copper and a superconducting material such as $Nb_3Sn$ or $NbTi$. The latter two materials are proposed for commercial reactors while copper alone is suitable for coils used in tokamaks and other magnetic plasma confinement devices used in thermonuclear fusion research, now being tested. Each coil element 12 includes a curved outer portion 14, a straight vertical inner portion 16 mounted to an inner central support cylinder 18, and joint members 20 and 21 for releaseably fixing curved outer portion 14 to vertical inner portion 16. Joint members 20 and 21 may be simply bolted between opposite ends of inner portion 16 and curved outer portion 14. Joints in ordinary magnets must normally withstand the tensile load of the magnet. In this embodiment, the force at joints 20 and 21 may be made zero or may be compressive, as described more fully below, so that it is not necessary that the joint provide structural support. Practically, then, the two sides of the joint will be bolted only to achieve electrical conduction and not for any structural reason. It is important that outer portion 14 merge smoothly into vertical slopes at its intersections with joints 20 and 21.

The exact shape of each coil element 12, which will be described in greater detail below, is such that a current I in each coil element 12, and a toroidal magnetic field B disposed within the overall torus 10, produce a pure tension stress within each coil element 12. In order to reduce the tension $T_0$ in inner portion 16 of each coil element 12, there are provided an upper support assembly 24 and a identical lower support assembly 25, which transfer the tension from inner portion 16 to outer portion 14. Support assemblies 24 and 25 respectively include common supports 26 and 27 suitably in the form of solid disks or rings respectively disposed vertically above and below central support cylinder 18. Compression cylinders 28 and 29 which may be integral with disks 26 and 27 are respectively fixed to the inner ends 30 and 31 of each of the coil curved outer portion 14 at joints 20 and 21. Tension links 32 and 33, which may be flexible or rigid elongated members, extend at an angle $\theta$ to the horizontal, and are connected at one end to disks 26 and 27 and at corresponding points at their opposite ends to coil outer portions 14. Tension links 32 and 33 are preferably fixed to coil outer portions 14 in tangential relation thereto. Compression cylinders 28 and 29 may be replaced by posts respectively connected to individual coil outer portions 14 at joints 20 and 21. Support assemblies 24 and 25 are suitably composed of steel parts.

Figure 4:
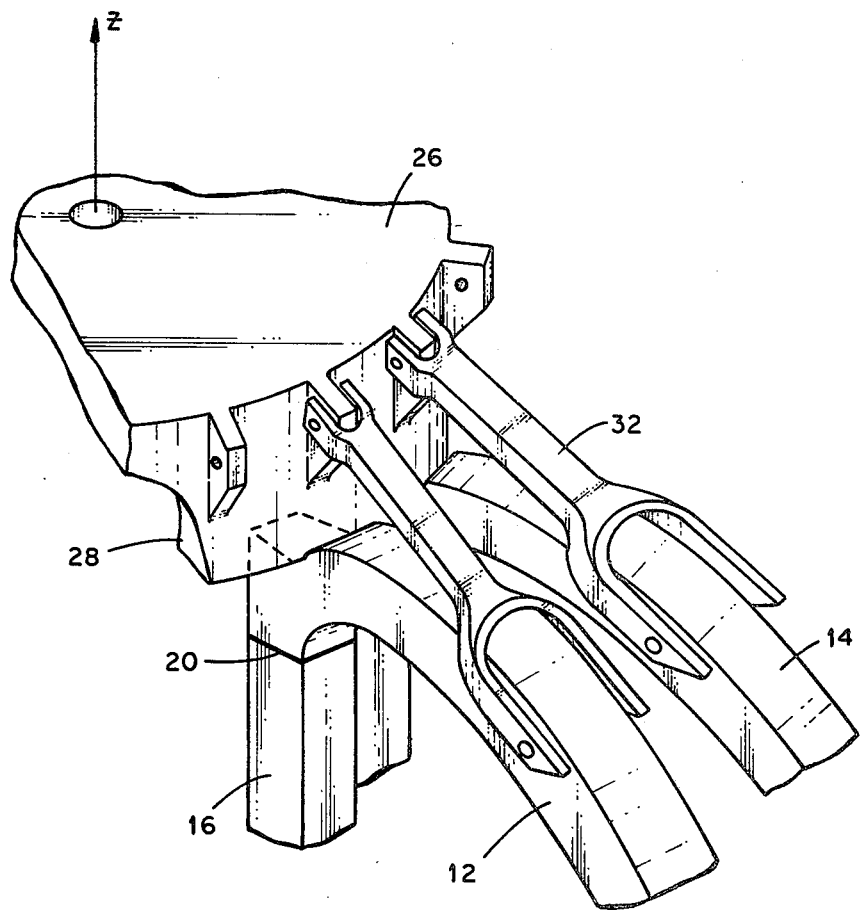
FIG. 4 is a partial perspective drawing illustrating one method by which coils may be attached to an integral disc and compression cylinder.
Figure 5:
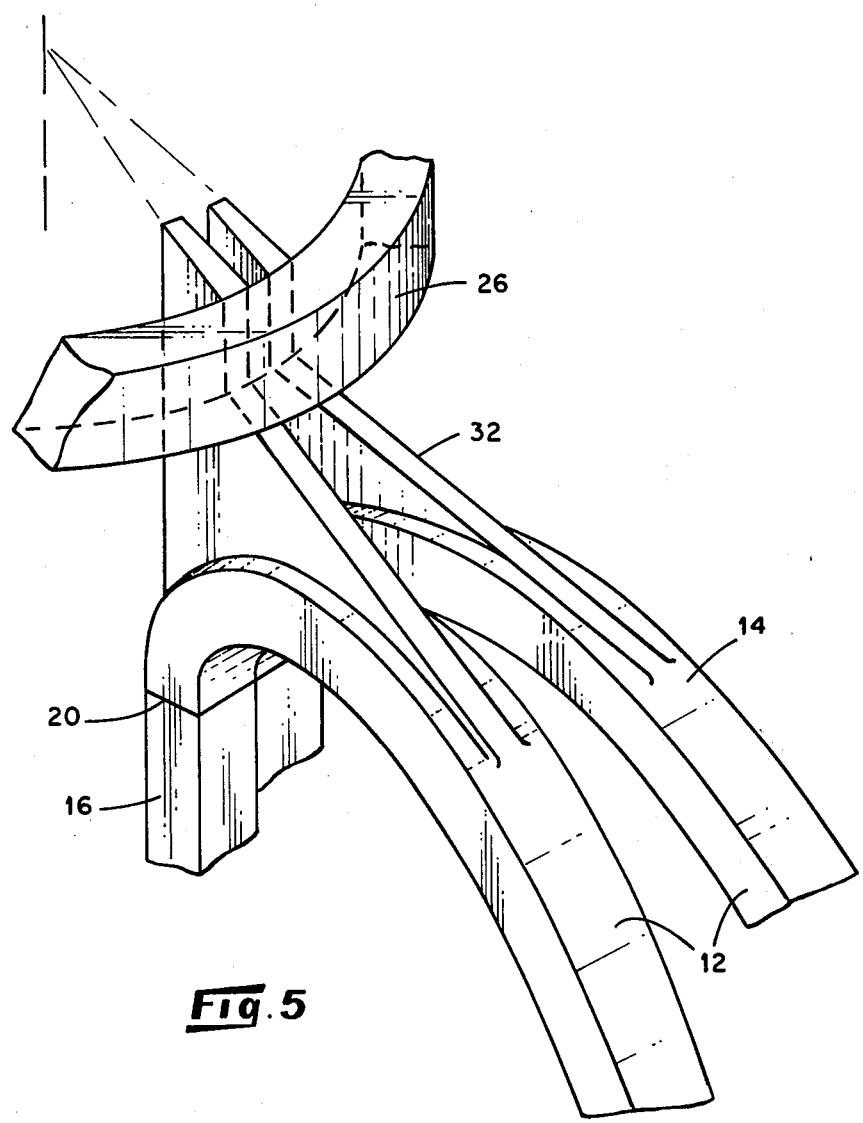
FIG. 5 is a partial perspective drawing illustrating an alternate structure by which coils may be attached to a tension ring using a structural blade.

Compression cylinders 28 and 29 transmit force directed toward the mid-plane 22. Support assemblies 24 and 25 serve to reduce expansive stresses or generate compressive stresses in the straight vertical portions 16 of coil elements 12 by transmitting to the coil elements forces which are tangential thereto. Thus, tension links 32 and 33 may be flexible or rigid, and may, in accordance with the invention, be replaced by an integral sheet connected at various points to the different coil elements 12 or may be replaced by a girdling tension band extending across disk 26 of upper support assembly 24 and below disk 27 of lower support assembly 25. Two of the variety of forms which tension links 32 and 33 may take are illustrated in FIGS. 4 and 5. The structure illustrated in FIG. 5 is functionally equivalent to that in FIG. 4.

The intersection of tension links 32 and 33 and coil outer portion 14 separates the outer portion 14 into inner curved parts 34 and 35 and an outer curved part 36. If, in the present embodiment, it is desired that there be zero tension (tensile force) in the coil inner portion 16 ($T_0=0$), then the compressive force in compression cylinders 28 and 29 must equal the tension $T_1$ in coil parts 34 and 35. As is apparent from the schematic diagram in FIG. 6, because the vertical component of the tension in tension links 32 and 33 must equal the compression in cylinders 28 and 29:

$$(T_2 - T_1) \sin \theta = T_1, \quad (1)$$

where $T_2$ is the tension in part 36 of coil element 12.

It is well known that for a toroidal conducting shell having a current I of uniform current density the magnetic field falls linearly through the shell so that the average tension T at a radius r from the axis of symmetry caused thereby is given by:

$$T(r) = \frac{I \cdot B(r) \cdot \rho(r)}{2}, \quad (2)$$

where $\rho$ is the radius of curvature of the conductor at r.

When the conductor is a toroid it is well known that the magnetic field generated by a constant current therethrough varies inversely as the radius r, and may be expressed as:

$$B(r) = B_o r_o / r, \quad (3)$$

where $B_o$ is the magnetic field strength at $r = r_o$.

Thus, the average tension T may be expressed as:

$$T(r) = \frac{IB_o r_o}{2r} \cdot \rho(r) \quad (4)$$

Under the above stated conditions, the total vertical force on the upper portion of a toroidal coil element is known to be given by the expression:

$$F = \frac{IB_o r_o \ln(r_2/r_1)}{2}, \quad (5)$$

where $r_1$ and $r_2$ are respectively the inner and outer radial limits of the toroid.

If the tension in inner coil element portion 16 is to be zero, then the tension $T_2$ in part 36 equals F or:

$$T_2 = \frac{IB_o r_o \ln(r_2/r_1)}{2}, \quad (6)$$

Comparing equations (4) and (6) it can be seen that the radius of curvature $\rho(r)$ in part 36 is given by:

$$\rho(r) = r \ln(r_2/r_1). \quad (7)$$

Substituting the expressions (4) and (6) into equation (1), it is seen that the radius of curvature $\rho(r)$ in each of parts 34 and 35 is given by:

$$\rho(r) = \frac{r \ln(r_2/r_1)}{1 + (1/\sin\theta)}. \quad (8)$$

With a coil element of the above defined shape, and the use of coil support assemblies 24 and 25 as described above, joints 20 and 21 with only bolts for connections, may safely be utilized since no tensile force will be generated therethrough when a current is developed in the coil.

If an expensive tensile stress is desired in the vertical inner portion 14 of coil element 12, then $\rho(r)$ defined in equations (7) and (8) should be increased by a constant factor in parts 34 and 35 and decreased by a constant factor in part 36. On the other hand, if a compressive tensile stress is desired in portion 14, then $\rho(r)$ should be decreased by a constant factor in parts 34 and 35 and increased by a constant factor in part 36.

Figure 6:
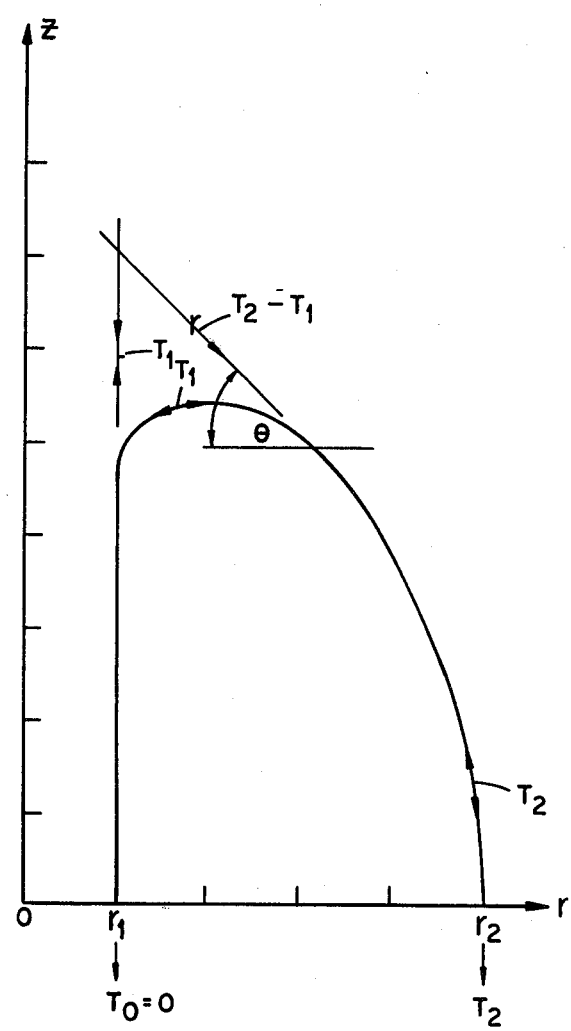
FIG. 6 is a schematic drawing of the top half of a coil element of the first embodiment of the present invention illustrating the coil shape and the tensile forces thereon.
Figure 7:
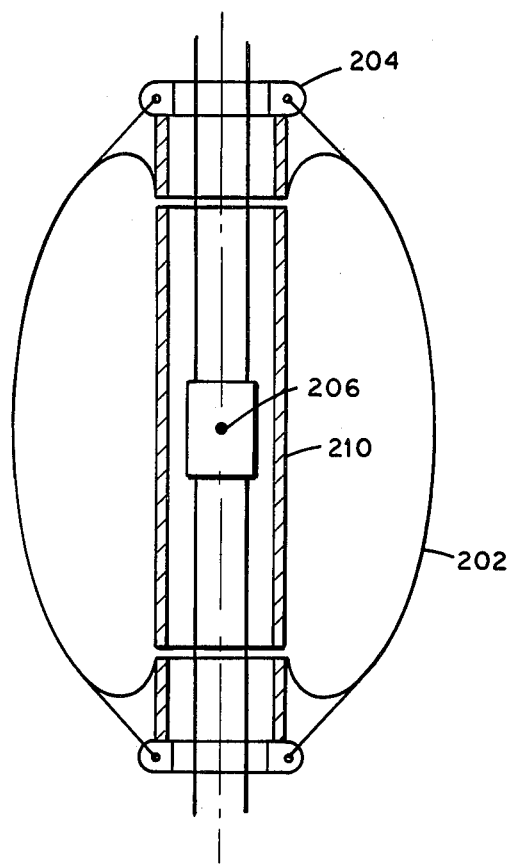
FIG. 7 is a schematic drawing of a second embodiment of the present invention.

A second embodiment of the invention which is illustrated in schematic in FIG. 7 is a central high energy particle detector employing a toroidal magnet 202. Located at the central axis of symmetry of the toroidal magnet is the particle source 206, e.g., a source of pions. The coil elements 202 and supporting structure 204 are in substantially the same configuration as in the plasma confinement device of the first embodiment illustrated in FIGS. 3 and 6. The coil elements, however, are preferably composed of aluminum-stabilized superconductors so as to be more transparent to the particles to be detected.

In the same manner as is described above with regard to the first embodiment illustrated in FIGS. 3 and 6, the configuration of coil elements 202 and supporting structure 204 illustrated in FIG. 7 limits the tensile stress in the inner portion 210 of the coil elements so that cross sectional area of said inner portions can be minimized, and the transparency of the coil element inner portions to the particles to be detected can thereby be increased.

Although only two exemplary embodiments of the present invention have been disclosed in detail above, for illustrative purposes, it will be understood that variations and modifications of the disclosure which lie within the scope of the appended claims are contemplated.

What is claimed is:

1. A magnet for developing a large toroidal magnetic field, comprising:
   a. a plurality of coil elements, each having straight inner major radius portion and a curvilinear outer major radius portion, the inner portion of each of said coil elements being located at a same distance from a central axis and parallel to the central axis, forming a torus for confining a toroidal magnetic field therewithin; and
   b. structural means, connected to each of said plurality of coil elements, for exerting purely tensile forces on said plurality of coil elements when said plurality of coil elements are energized with a large current flow therein to reduce the tensile stress in said inner portion of each of said plurality of coil elements.

2. A magnet as in claim 1 further comprising:
   a. a cylinder having an outside surface; and
   b. each of said plurality of coil elements forming a closed loop, each of said inner radius portions being fixed to said outside surface.

3. A magnet for confining a large cross section plasma column in a strong magnetic field, comprising:
   a. a support core having a central axis extending in a first direction and having an external surface;
   b. a plurality of closed loop coil elements, each having an inner major radius portion extending generally parallel to said central axis and connected to said external surface, and an outer major radius portion, said elements being spaced circumferentially one from the other about said core, forming a torus about said central axis, for confining said plasma column therein; and c. structural means, connected to said inner and outer portions, for reducing tensile stress in said inner portion when said plurality of coil elements are energized with a large current flow therein.

4. A magnet as in claim 3 wherein said outer major radius portions has a shape such that said outer major radius portion is maintained in pure tension when said plurality of coil elements are energized with a large current therein.

5. A magnet as in claim 4 wherein said support core is cylindrically shaped.

6. A magnet as in claim 3 wherein said inner portion comprises first and second joint members disposed at opposite ends of said inner portion for removably connecting together said outer portion and said inner portion.

7. A magnet as in claim 3 wherein said structural means comprises means for substantially eliminating expansive tensile force in said inner portion when said plurality of coil elements are energized with a large current flow therein.

8. A magnet as in claim 3 or claim 7 wherein said central axis extends vertically and said structural means comprises:

a. upper common supprt means disposed above said plurality of coil elements;

b. vertically extending upper inner support means, connecting said upper common supporting means to the upper end of each said inner portion for vertically supporting each of said coil elements;

c. upper outer support means, extending between and connected at opposite ends to said upper common support means and each said outer portion, said upper outer support means making tangential contact with each said outer portion at one of said opposite ends, for tangentially supporting each said outer portion;

d. lower common support means disposed below said plurality of coil elements;

e. vertically extending lower inner support means, connecting said lower common supporting means to the lower end of each said inner portion for vertically supporting each of said coil elements; and f. lower outer support means, extending between and connected at opposite ends to said lower common support means and each said outer portion, said lower outer support means making tangential contact with each said outer portion at one of said opposite ends, for tangentially supporting each said outer portion;

9. A magnet as in claim 8 wherein:

a. said plurality of coil elements are structurally symmetrical with respect to a horizontal mid-plane and the angle $\theta$ between the horizontal and each said outer portion at the points of contact between each said outer portion and said upper and lower outer support means are the same; and b. each said outer portion having a radius of curvature $\rho_1$ respectively between said upper and lower inner support means and said upper and lower outer support means, defined by the following equation:

$$\rho_1 = r \ln(r_2/r_1)$$

and each said outer portion having a radius of curvature $\rho_2$ between said upper and lower outer support means defined by the following equation:

$$\rho_2 = \frac{r \ln(r_2/r_1)}{1 + (1/\sin\theta)}$$

wherein (1) r is the horizontal distance from the center axis of said central support cylinder and a point on said coil element, (2) $r_1$ is the horizontal distance between the center axis and said inner portion, and (3) $r_2$ is the horizontal distance between the center axis and said outer portion in the mid-plane;

c. whereby said outer portion of each of the said plurality of coil elements are maintained in pure tension and said inner portion of each of said plurality of coil elements experience zero tension when said plurality of coil elements are energized with a large current flow therein.

10. A magnet as in claim 8 wherein said upper and lower outer support means comprises a series of elongated outer support members.

11. A magnet as in claim 8 wherein said upper and lower inner support means each comprise a compression cylinder respectively integral with said upper and lower common support means.

12. A magnet as in claim 8 wherein said upper and lower inner support means comprise a series of vertical posts respectively fixed to said central support cylinder and a corresponding one of said inner portions.

13. In a device for detecting high energy particles, a magnet for developing a strong toroidal magnetic field, comprising:

a. support means having a central axis and an external surface;

b. a plurality of closed loop coil elements, each of said elements having an inner major radius portion extending parallel to said central axis and an outer major radius portion, said inner portion being mounted to said external surface, said elements being spaced circumferentially one from the other about said core to form a torus, the cross sectional area of said inner portion measured in a plane perpendicular to said central axis being substantially less than the cross sectional area of said outer portion measured in said plane, said torus surrounding a source of said high energy particles; and c. structural means, connected to said inner and outer portions, for reducing tensile stress in each said inner portion when said plurality of coil elements are energized with a large current flow therein.

14. In a device as in claim 13, wherein said central axis extends vertically and said structural means comprises:

a. upper common support means disposed above said plurality of coil elements;

b. vertically extending upper inner support means, connecting said upper common supporting means to the upper end of each said inner portion for vertically supporting each of said coil elements;

c. upper outer support means, extending between and connected at opposite ends to said upper common support means and each said outer portion, said upper outer support means making tangential contact with each said outer portion at one of said opposite ends, for tangentially supporting each said outer portion;

d. lower common support means disposed below said plurality of coil elements;

e. vertically extending lower inner support means, connecting said lower common supporting means to the lower end of each said inner portion for vertically supporting each of said coil elements; and f. lower outer support means, extending between and connected at opposite ends to said lower common support means and each said outer portion, said lower outer support means making tangential contact with each said portion at one of said opposite ends, for tangentially supporting each said outer portion.

15. In a device as in claim 14, wherein:

a. said plurality of coil elements are structurally symmetrical with respect to a horizontal mid-plane and the angle $\theta$ between the horizontal and each said outer portion at the points of contact between each said outer portion and said upper and lower outer support means are the same; and b. each said outer portion having a radius of curvature $\rho_1$ respectively between said upper and lower inner support means and said upper and lower outer support means, defined by the following equation:

$$\rho_1 = r \ln(r_2/r_1)$$

and each said outer portion having a radius of curvature $\rho_2$ between said upper and lower outer support means defined by the following equation:

$$\rho_2 = \frac{r\ln(r_2/r_1)}{1 + (1/\sin\theta)}$$

wherein:
(1) r is the horizontal distance from the center axis of said central support cylinder and a point on said coil element,
(2) $r_1$ is the horizontal distance between the center axis and said inner portion, and
(3) $r_2$ is the horizontal distance between the center axis and said outer portion in the mid-plane;

c. whereby said outer portion of each of the said plurality of coil elements are maintained in pure tension and said inner portion of each of said plurality of coil elements experience zero tension when said plurality of coil elements are energized with a large current flow therein.

16. A magnet as in claim 1 or claim 3 or claim 13 wherein said plurality of coil elements comprise superconducting material.

17. A magnet as in claim 6 wherein said joint members are bolted to said outer portion.

18. A magnet as in claim 3 or claim 13 wherein said structural means comprises means for transferring tensile stress from said inner portion to said outer portion.

* * * * *